March 19, 1968  G. L. MYERS ET AL  3,373,548
ROTOR FOR CUTTING, CHOPPING, ETC.
Filed Dec. 11, 1964  2 Sheets-Sheet 1

INVENTORS
G. L. MYERS
A. K. LAWRENCE
BY
John M Nolan
ATTORNEY

March 19, 1968   G. L. MYERS ET AL   3,373,548
ROTOR FOR CUTTING, CHOPPING, ETC.
Filed Dec. 11, 1964   2 Sheets-Sheet

INVENTORS
G. L. MYERS
A. K. LAWRENCE
BY
ATTORNEY

United States Patent Office 3,373,548
Patented Mar. 19, 1968

3,373,548
ROTOR FOR CUTTING, CHOPPING, ETC.
Glenn L. Myers and Allan K. Lawrence, Ottumwa, Iowa, assignors to Deere & Company, Moline, Ill., a corporation of Delaware
Filed Dec. 11, 1964, Ser. No. 417,728
4 Claims. (Cl. 56—294)

ABSTRACT OF THE DISCLOSURE

A flail-type rotor having an elongated axial shaft of square cross section, a plurality of equally spaced, radially extending flails mounted on the shaft for rotation therewith and axial sliding thereon, a cylindrical spacer between the adjacent flails, and means at the opposite ends of the shaft for axially clamping the flails and spacers.

---

This invention relates to a rotor, and more particularly to a rotor for flail-type mowing, harvesting, and chopping machines.

Such machines generally include a rotor rapidly rotating about a horizontal axis and having a plurality of radial flails, the material being introduced into the path of the flails and mowed or chopped thereby.

It is known that when a shaft rotates at a speed equal to the natural frequency of the shaft, a resonant condition occurs whereby any exciting force will likely cause vibrations to build up which will ultimately damage or destroy the machine. This speed is called the first critical speed and is equal numerically to the frequency of vibration of the shaft with the masses mounted on it if deflected by an external force while the shaft is at a standstill. While the critical speed can be calculated for shafts carrying certain types of loads and estimated for others, it will suffice to say that the critical speed of a shaft depends on the length of the shaft, the shaft diameter, the size and distribution of the load it carries, and the manner in which it is supported.

Thus, in a conventional flail type rotor, of given length, supported at both ends and carrying a load in the form of radial flails distributed along its length, this critical speed will depend on the diameter of the rotor shaft, the larger the shaft diameter the greater the first critical speed, or expressed in different terms, the greater the moment of inertia of the shaft about its axis, the higher the first critical speed.

Heretofore, it has been conventional to design the rotor shaft to provide for a relatively large moment of inertia whereby the critical speed is safely above the operating speed of the rotor.

The improved rotor of the present invention eliminates the heavy rotor shaft and allows operation of the rotor above its first critical speed, the design of the rotor being such that the moment of inertia of the rotor drops when the critical speed is approached, thereby lowering the critical speed to a speed below the speed at which the rotor is then rotating. This is accomplished by providing cylindrical spacers around the shaft along its length tightly clamped longitudinally to initially form an integral part of the shaft, increasing the effective shaft diameter. When the shaft deflects due to vibrations, the spacers open up, decreasing the effective shaft diameter and consequently the moment of inertia since the spacers no longer form an integral part of the shaft, whereby the first critical speed is substantially reduced.

Accordingly, the principal object of the invention is to provide a novel rotor construction capable of rotating above the first critical speed of the rotor.

Another object is to provide such a rotor wherein the moment of inertia of the rotor decreases as it approaches or reaches its first critical speed.

Another object is to provide a plurality of cylindrical spacers longitudinally clamped around a rotor shaft for effectively increasing the shaft diameter until the critical speed of the rotor is reached.

Another object is to provide such spacers around the rotor shaft and between adjacent flails for longitudinally positioning the flails on the shaft.

Another object is to provide a rotor shaft having a regular polygonal cross section for orienting radial flails on the shaft.

Another object is to provide such a rotor wherein the radial flails are so arranged to reduce the dynamic imbalance of the rotor.

Another object is to provide means for damping the vibrations caused by rotor imbalance or any external exciting force.

Another object is to provide novel means for longitudinally clamping the spacers and flails on the rotor shaft.

Another object is to provide self-tightening clamping means which will prevent a decrease in clamping action with use.

Another object is to provide such clamping means which will reduce stresses in the rotor shaft.

Another object is to provide such a rotor of lightweight construction to reduce the production cost of the rotor.

Still another object is to provide such a rotor having easily replaceable parts for ease in maintenance.

These and other objects of the invention will become apparent from a consideration of the following detailed description and accompanying drawings wherein.

Figure 1:
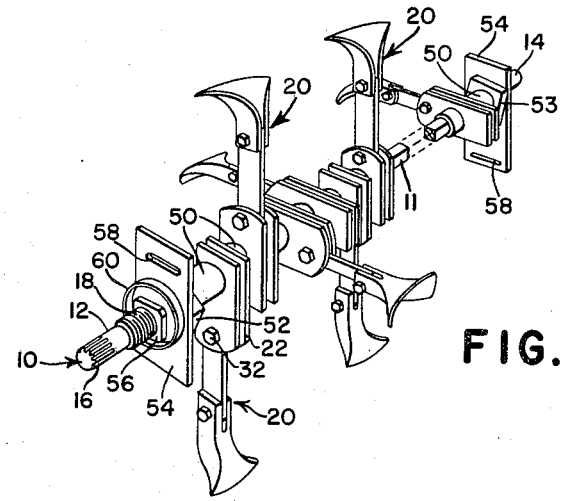
FIG. 1 is a perspective view of the rotor assembly with an intermediate portion of the rotor broken away.
Figures 2, 3:
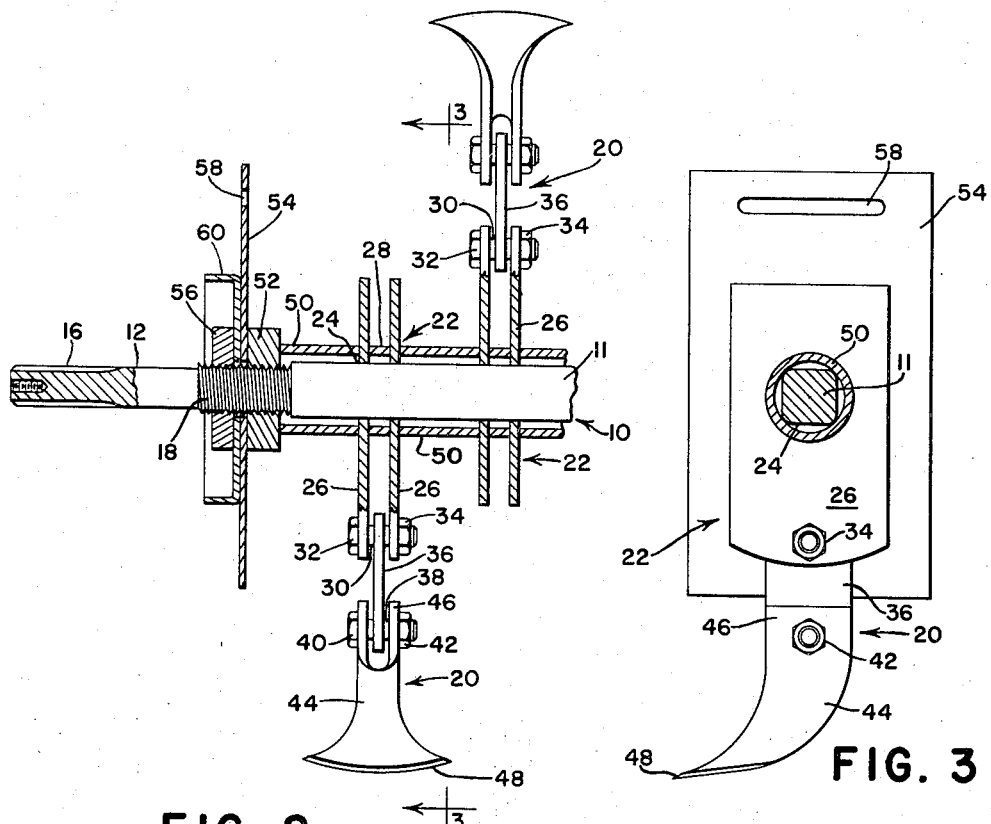
FIG. 2 is an enlarged longitudinal sectional view of the near end of the rotor shown in FIG. 1.
FIG. 3 is a sectional view taken along the line 3—3 of FIG. 2.

Referring now to the drawings and in particular to FIGS. 1, 2, and 3, there is shown a flail-type rotor assembly having a central shaft 10, the intermediate portion 11 being non-circular in cross section. While the cross section is preferably square as shown, it could be in the shape of any regular polygon such as a hexagon or an oxtagon. The opposite ends of the shaft form end portions 12 and 14 which are circular in cross section, the end portion 12 having a splined surface 16 to accommodate means for driving the rotor. The end portion 12 also has a threaded surface 18 between the splined surface and the non-circular shaft portion.

A plurality of radial flails, indicated generally by the numeral 20, are mounted on the shaft 10, each flail including a suspension member 22 having a central aperture 24 of substantially the same configuration as the shaft cross section, the shaft being inserted through the aperture for rotation of the suspension member and shaft in unison. The suspension member is formed by a pair of identical plates 26 separated by a cylindrical spacer 28 around the shaft, the spacer having an inner diameter substantially equal to the diagonal dimension of the intermediate portion 11 of the shaft 10.

A pivot 30, axially parallel to the shaft 10, is formed between each pair of plates at the ends of each suspension member by a bolt 32 extending through the plates and secured by a nut 34. A flail link 36 is swingably mounted on each pivot 30, and carries a second pivot 38 parallel to the pivot 30, the pivot 38 being formed by a bolt 40 extending through an aperture in the flail link and secured by a nut 42.

A flail knife 44 having a bifurcated shank portion 46 and a cutting edge 48 substantially parallel to the shaft axis, is swingably mounted on the pivot 38. Thus, while the suspension member 22 is rigidly mounted on the shaft, the flail knife and link will swing about the pivots 30 and 38 upon striking a solid object, thereby preventing damage to the machine.

The flails 20 are positioned on the shaft 10 by sleeve-like cylindrical spacers 50 around the shaft and between adjacent flails, the spacers 50 also having substantially the same inner diameter as the diagonal dimension of the intermediate portion of the shaft. A spacer 50 is also positioned outside of each end flail. The spacers 28 and 50 and flail plates 26 are axially clamped by nut-like retaining means 52 and 53 which are screwed on the threaded surfaces 18 at opposite ends of the shaft 10, the retaining means being tightened to axially compress the plates and spacers, whereby the flail plates and spacers form an integral part of the shaft. Thus, the effective diameter and consequently the moment of inertia of the shaft about its axis are substantially increased, thereby increasing the first critical speed of the shaft, since the critical speed for any given shaft increases with an increase in shaft diameter or moment of inertia as previously described.

As the shaft is rotated and reaches its first critical speed, it loses its ability to resist any exciting force such as vibrations due to imbalance of the rotor or flail impact with any object. Accordingly, when the shaft reaches its first critical speed, it begins to deflect radially. However, as soon as there is a substantial radial deflection, the surface of the shaft in the direction of deflection is under a tensile strain while the opposite surface is under a compressive strain. The tensile strain causes a gap between the spacers 28 and 50 and the flail plates 26 whereby the spacers and flail plates are no longer an integral part of the shaft 10, reducing the effective diameter to the diameter of the shaft 10. The sudden decrease in shaft diameter and consequently the moment of inertia, substantially decreases the first critical speed. The rotor is then safely rotating above the first critical speed, and since the rotor is accelerating, it is rotating above the critical speed when the vibrations are damped and the spacers and flail plates again form an integral part of the shaft, increasing the effective diameter and consequently the critical speed to its original value.

The converse sequence occurs as the rotor decelerates, the speed reaching the critical speed of the larger diameter whereby the outer diameter opens up to lower the critical speed, the outer diameter then closing after the vibrations are damped after the speed is reduced to a speed below the original critical speed, whereby the rotor is then rotating safely below the first critical speed.

As is apparent from the drawings, the flails 20 are mounted in four longitudinal banks spaced at 90° intervals around the rotor circumference, one bank extending from each side of the square shaft 10, the number of flails in each bank being equal to provide an approximate static balance of the rotor. The flails are axially positioned so that each flail is adjacent a flail extending in the opposite direction. When the rotor is rotating, the centrifugal force of each flail exerts a radial force on the shaft, the radial force of oppositely extending flails acting in opposite directions and creating a couple. Thus, although the rotor is approximately statically balanced, it is dynamically unbalanced, the oppositely extending flails being adjacently positioned to reduce the moment arm of the couple, thereby decreasing the dynamic imbalance. Of course, the dynamic imbalance could be substantially eliminated by having oppositely extending flails rotating in the same transverse plane. However, this would double the number of flails, increasing the cost of the rotor.

To compensate for the dynamic imbalance, a balance plate 54 is affixed to each end of the shaft adjacent the clamping nut 52 by means of lock nuts 56 which are also screwed onto the threaded surface 18. The balance plates have slot means 58 at one end for mounting balancing weights and extend radially in opposite directions. The weighted, oppositely extending balance plates create a couple for counteracting the dynamic imbalance due to the flails 20.

The rotor is conventionally supported on bearing means (not shown) at the cylindrical end portions 12 and 14. A bearing shield 60 is also affixed to each end of the shaft by the lock nuts 56.

The spacers 28 and 50, serve an additional function in addition to locating the flails and changing the diameter of the shaft, in that they dampen vibrations caused by any exterior exciting force or rotor imbalance, since the friction between the spacers and the flail plates exert a damping force. This damping action is especially advantageous to retard the vibrations when the critical speed is reached.

Figure 4:
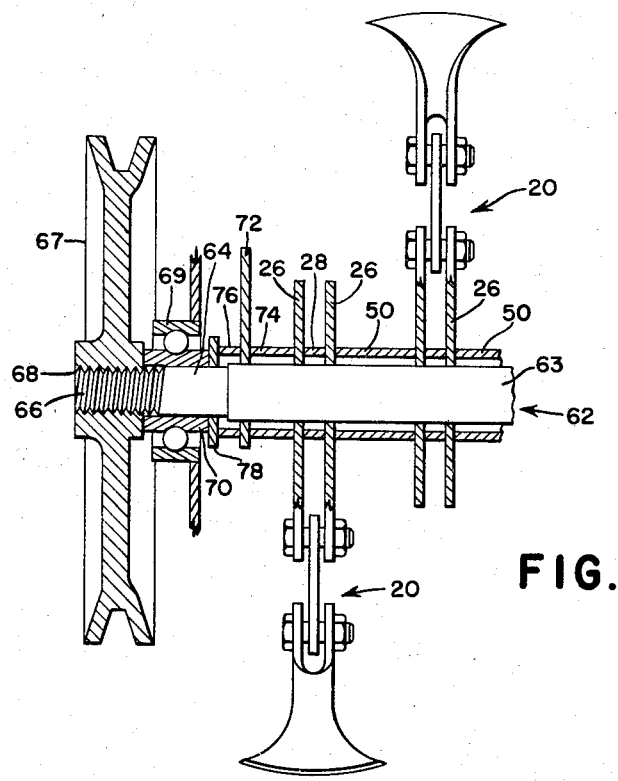
FIG. 4 is a view similar to FIG. 2 but showing a slightly different embodiment of the rotor assembly including a drive sheave on the end of the rotor shaft.

A slightly different embodiment of the invention is shown in FIG. 4, the rotor assembly including a central axial shaft 62 having an intermediate portion 63 with a square cross section and having an end portion 64 of circular cross section, the end of which has a left-hand threaded surface 66. A drive sheave 67 having a central left-hand threaded bore 68 is mounted on the threaded surface 66 for driving the shaft 62 in a counterclockwise direction as viewed from the sheave end of the shaft, the rotation of the sheave tending to screw the sheave further along the threaded surface 66.

Although only one end of the rotor is shown, it can be appreciated that the other end of the rotor is similar except that a different threaded member is substituted for the sheave 67. The shaft is supported at its end portions by a bearing 69 having a cylindrical inner sleeve 70 which accommodates the end portion 64. The shaft again carries a plurality of radial flails 20 including plates 26 mounted on the shaft and separated by spacers 28, the flails also being separated by spacers 50 around the shaft. A balance plate 72, having an aperture substantially the same as the shaft cross section, is mounted on each end of the shaft, between cylindrical spacers 74 and 76.

The spacers and flails are axially held by a retainer ring 78 at each end of the shaft between the inner sleeves 70 of the bearing and the spacer 76. The spacers 28, 50, 74, and 76, plates 26, retainer ring 78, and bearing sleeves 70 are axially clamped by tightening the sheave 67 on the threaded surface 66 so that said components form an integral part of the shaft, with the same effects as previously described. Since the torque on the sheave 67 tends to tighten the sheave on the shaft, exerting a constant clamping force, the clamping action will not decrease with wear on the components.

Figure 5:
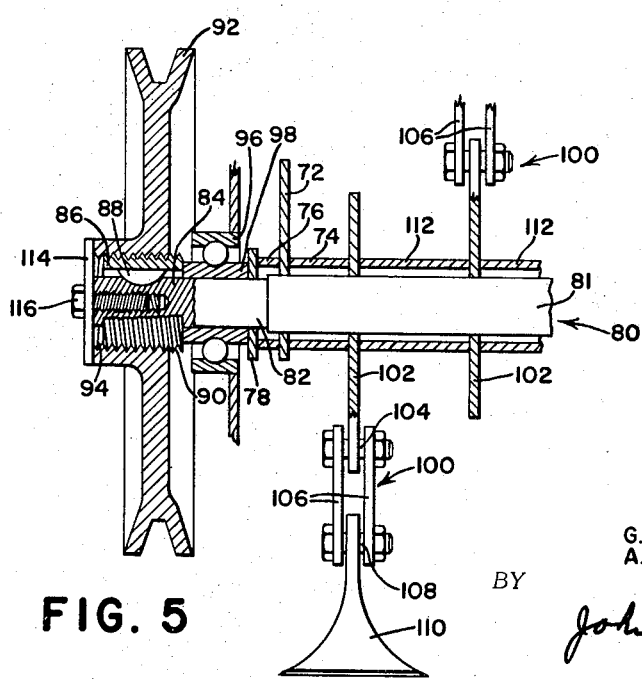
FIG. 5 is a view similar to FIG. 4 of another embodiment of the rotor assembly.

FIG. 5 shows a similar embodiment to the embodiment shown in FIG. 4, the method of mounting the sheave on the shaft being different to avoid stress concentration in shaft and the flail configuration being slightly different.

The rotor assembly again includes a central shaft 80 having an intermediate portion 81 with a square cross section and having an end portion 82 of circular cross section and a left-hand threaded axial screw tap 84 extending from the end of the shaft. A sleeve 86 is mounted around the end portion 82 for a small amount of axial movement, the sleeve being rotationally locked to the shaft by a key means 88. The exterior surface of the sleeve has a right-hand thread 90 on which a drive sheave 92 having an axial threaded bore 94 is screwed, for driving the rotor in a counterclockwise direction as viewed from the sheave end of the rotor.

The shaft is supported at its end by a bearing having a cylindrical inner sleeve 98 which accommodates the end portion 82. A plurality of radial flails 100 are mounted on the shaft, each flail including a suspension member 102 mounted on the shaft for axial movement only. The suspension member carries an axially parallel pivot 104 on which a pair of flail links 106 is swingably mounted, the links in turn carrying a parallel pivot 108 on which a flail knife is swingably mounted. This flail construction is a converse of the previously described construction, although its action and effect is the same.

The flails are axially located by sleeve-like cylindrical spacers 112 mounted around the shaft between adjacent suspension members 102. A balance plate 72 is mounted on the shaft between spacers 74 and 76 as previously described, and a retainer ring 78 is again used adjacent the bearing sleeve 98.

An end disc 114, having a larger diameter than the sleeve 84, is coaxially affixed to the end of the shaft 80 by the left-hand threaded screw 116 threaded into the screw tap 84.

While only one end of the rotor is shown, the other end is similar and includes means for axially retaining the axially movable components.

The stacked sleeve 98, retainer ring 78, spacers 76, 74, and 112, and flail suspension member 102 are axially retained and clamped by the sleeve 90, which is held by the sheave 92, which in turn is retained by the disk 114 attached to the end of the shaft by the screw 116. When the counterclockwise driving force is applied, the sheave would tend to screw off the sleeve 86 since it has a right-hand thread. However, the sheave is prevented from moving off the end of the shaft by the disk 114, and, therefore, any relative movement between the sheave and the sleeve moves the sleeve toward the bearing 96, whereby a constant axial clamping force is applied to the bearing sleeve 98.

The constant clamping force eliminates looseness between the stacked parts, maintaining the parts as an integral part of the shaft except at the critical speed as previously described.

It is also a feature of the clamping arrangement that the counterclockwise drive torque on the sheave 92 would also tend to rotate the disk 114 and thereby the screw 116 in a counterclockwise direction. Since the screw has a left-hand thread, this torque would tend to tighten the screw, thereby preventing loosening of the assembly during operation.

Other features and advantages of the present invention will readily occur to those skilled in the art, as will many modifications and alterations in the preferred embodiment of the invention described herein, all of which may be achieved without departing from the spirit and scope of the invention.

What is claimed is:

1. A rotor of the class described comprising an elongated shaft having first and second opposite end portions of circular cross section and an intermediate portion having a cross section in the shape of a regular polygon, the first end portion of the shaft having a threaded surface, the threads advancing along the shaft in the direction of shaft rotation, a plurality of radial flails longitudinally spaced along the intermediate portion of the shaft in a plurality of banks equally spaced around the rotor circumference and having an equal number of flails, the number of sides on the intermediate portion of the shaft being a whole number multiple of the number of banks of flails, said flails including a suspension member having an aperture through which the shaft extends for axial movement only of the suspension member relative to the shaft, a plurality of sleeve-like spacers around the shaft between and adjacent to the flails, retaining means mounted on the shaft for axially retaining the spacers from movement toward the second end portion, and a drive member having a central threaded bore screwed onto the first end portion threaded surface axially engaging the stacked flails and spacers whereby the torque on the drive member exerts an axial force compressing the flails and spacers between the drive member and the retaining means.

2. A rotor of the class described comprising an elongated shaft having first and second opposite end portions of circular cross section and an intermediate portion of square cross section, the first end portion having a threaded surface, a plurality of radial flails equally spaced longitudinally along the intermediate portion of the shaft in four banks, said banks being equally spaced around the rotor circumference and each bank having an equal number of flails positioned so that each flail is axially adjacent an oppositely extending flail, said flails including a transverse suspension member having an aperture substantially conforming to the shaft cross section, the shaft extending through said aperture for axial movement only of the flails on the shaft, a plurality of cylindrical sleeve-like spacers around the shaft adjacent and between said flails, means mounted on the shaft for axially retaining the spacers and flails from movement off the second end portion, and a drive member having a central threaded bore screwed onto the first end portion threaded surface, axially engaging the stacked flails and spacers whereby the torque on the drive member exerts an axial force compressing the flails and spacers between the drive member and retaining means.

3. The invention defined in claim 2 and including a pair of balance members having an aperture substantially conforming to the shaft cross section, the shaft extending through said aperture, the balance members being axially clamped with the stacked flails and spacers and extending radially from the shaft in opposite directions at opposite ends of the intermediate portion of the shaft.

4. A flail-type rotor for an agricultural machine or the like comprising: an elongated shaft having opposite end portions and an intermediate portion in the shape of a regular polygon; a plurality of flexible flails, each flail including a rigid suspension member having an aperture substantially conforming to the cross section of the intermediate portion of the shaft, the flails being mounted on the shaft at equal axial intervals with the intermediate portion of the shaft extending through the suspension member apertures; a plurality of cylindrical spacers coaxially mounted on the shaft adjacent to and between the suspension members; a first retainer means mounted on one end of the shaft for axially retaining the flails and spacers from movement off said end; a second retainer means axially shiftable on the other end portion of the shaft to axially clamp the stacked flails and spacers between the retaining means; a power input member; means drivingly mounting the power input member to said other end of the shaft and including thread means operative between the input member and the second retainer means whereby the normal driving torque on the input member exerts an axial force on the second retainer member to compress the flails and spacers.

References Cited

UNITED STATES PATENTS

| | | | |
|---|---|---|---|
| 2,509,343 | 5/1950 | Henderson | 56—294 |
| 2,827,751 | 3/1958 | Mascaro | 56—294 X |
| 2,925,293 | 2/1960 | Voss et al. | 74—230.05 X |
| 2,938,326 | 5/1960 | Lundell | 56—24 X |
| 2,952,465 | 9/1960 | Skromme | 275—3 |
| 3,261,151 | 7/1966 | Breed et al. | 56—294 |

ABRAHAM G. STONE, *Primary Examiner.*

P. A. RAZZANO, *Assistant Examiner.*